Patented Oct. 28, 1952

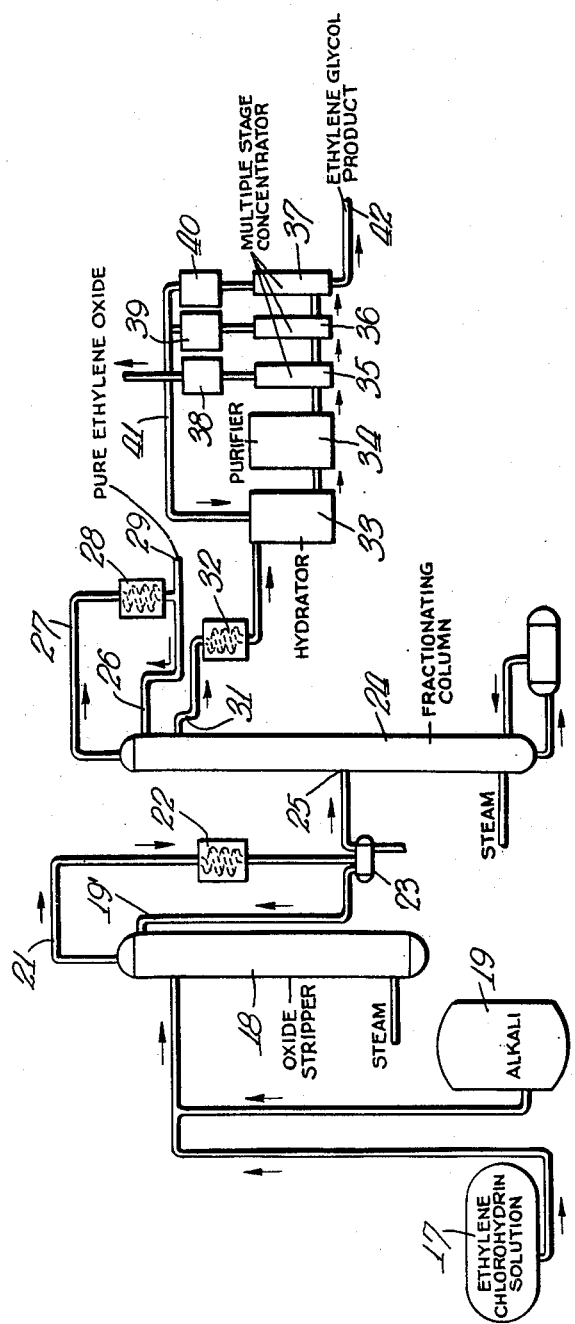

2,615,901

UNITED STATES PATENT OFFICE 2,615,901

PROCESS OF PRODUCING ETHYLENE OXIDE SUBSTANTIALLY FREE OF ACETALDEHYDE

Paul P. McClellan, Old Greenwich, Conn., assignor to Jefferson Chemical Company, Inc., New York, N. Y., a corporation of Delaware Application May 11, 1949, Serial No. 92,542

5 Claims. (Cl. 260—348.6)

This invention relates to the production of ethylene oxide containing little or no acetaldehyde.

One known method for producing ethylene oxide involves reacting ethylene and chlorine in a body of dilute aqueous hypochlorous acid to produce a dilute aqueous ethylene chlorohydrin solution. This solution is treated with alkali, e. g., lime or caustic soda, the ethylene oxide distilled off and fractionally condensed to produce an ethylene oxide fraction containing from 40% to 60% by weight of ethylene oxide the rest being chiefly ethylene dichloride, water and acetaldehyde. This fraction is purified by fractional distillation to produce the desired ethylene oxide for use in the synthesis of other products including ethylene glycol, diethylene glycol, triethylene glycol, polyethylene glycol, esters and ethers of these, dioxane, ethanolamines, acrylonitrile, etc. The ethylene oxide thus produced invariably contains an appreciable proportion of acetaldehyde, usually in excess of .3% by weight and frequently of the order of .7% to .8% and more by weight. Ethylene oxide containing such concentration of acetaldehyde is unsatisfactory for many commercial uses. Hence, it is necessary to subject the ethylene oxide thus produced to an additional purification treatment, for example, by careful refractionation through an additional distillation column to reduce the acetaldehyde content to below about 0.05% by weight to render it suitable for such uses. It is especially desirable to use ethylene oxide of very low acetaldehyde content for the manufacture of materials which are not normally purified by distillation after synthesis; examples of such materials are the ethers and esters of the higher polyethylene glycols, formed by the direct polyoxyethylation of alcohols, phenols, and acids. Presence of any substantial amount of acetaldehyde in the ethylene oxide used for these reactions appears to favor the formation of dark-colored by-product materials which are difficult, if not impossible, to remove from the finished products. Such additional purification treatment necessarily entails a loss in product yield and adds to the expense of producing the product.

It is an object of this invention to provide a process of producing high purity ethylene oxide, which process does not entail the further purification of the ethylene oxide product produced by the fractional distillation of the relatively dilute ethylene oxide recovered from the alkali treatment of the ethylene chlorohydrin.

Other objects and advantages of this invention will be apparent from the following detailed description thereof.

In accordance with this invention the ethylene oxide produced by the condensation of the overhead vapor driven off from the alkali treated ethylene chlorohydrin solution is subjected, as customary, to further distillation, a side stream is taken off containing ethylene oxide and substantially all of the acetaldehyde, and substantially pure ethylene oxide is removed overhead. The side-stream of ethylene oxide thus taken off is hydrated by reaction with an excess of water by any of the known methods to produce an intermediate product containing ethylene glycol, water, minor amounts of ethylene glycol condensation products such as diethylene glycol and triethylene glycol, and acetaldehyde. This intermediate product is then concentrated in a multiple stage evaporator. Most of the acetaldehyde is removed in the first stage and this aldehyde rich condensate is discarded. Condensate from the subsequent stages is recycled to the hydrator.

The ethylene oxide product taken off overhead contains as little as .05% by weight or less of acetaldehyde and is suitable for practically all end uses for ethylene oxide. The ethylene glycol produced from the ethylene oxide side-stream is of satisfactory purity for use as an anti-freeze and for other commercial uses. Since the acetaldehyde is removed in the course of the usual concentration of the ethylene glycol, with little or no loss of ethylene glycol or ethylene oxide, the process of this invention results in the production of ethylene oxide and ethylene glycol of high purity and this without subjecting these products to additional purification treatments.

The accompanying drawing is a flow sheet indicating the steps involved in the practice of the process of this invention.

Dilute aqueous ethylene chlorohydrin solution, prepared by interaction of chlorine and ethylene in an aqueous medium and containing hydrogen chloride is pumped from a storage tank 17 into an oxide stripper 18. Such ethylene chlorohydrin solutions generally contain small amounts of ethylene dichloride and higher-boiling water-insoluble chlorine compounds which can easily be separated as described below. Ethylene chlorohydrin solutions of less than 15% concentration, usually between about 3% and about 12%, are generally employed, but more concentrated or more dilute solutions may be employed if desired.

Stripper 18 may be a packed tower containing ceramic or other suitable packing or it may be fitted with plates or trays of any of the usual forms. The solution is supplied to stripper 18 at a temperature of from 150° to 200° F., preferably from 170° to 190° F. An alkali tank 19 supplies alkali, such as lime or caustic soda, to the solution flowing into the oxide stripper 18. The alkali is thus supplied continuously in amount at least sufficient to react with the ethylene chlorohydrin to convert it to ethylene oxide and to neutralize the hydrogen chloride, a small excess of alkali preferably being used. In the stripper 18 the alkali treated chlorohydrin solution is subjected to steam stripping. Preferably, the stripper 18 is operated under atmospheric or only slightly higher pressure, but the pressure used is not critical, and higher or lower pressures may be employed. The ethylene oxide vapors rise through the stripper countercurrent to descending reflux liquid introduced into the stripper through line 19'. The vapors taken off overhead through line 21 consisting chiefly of ethylene oxide and water vapor are condensed in condenser 22. The condensate thus produced is passed into a decanter 23 where it is subjected to decantation to separate crude ethylene dichloride from the supernatant ethylene oxide layer. A portion of this ethylene oxide is fed as reflux liquid through line 19' into the stripper 18. The remainder of the dilute ethylene oxide from decanter 23 is fed to a fractionating column 24 and is introduced thereinto at an intermediate point 25. Fractionating column 24 may be of the well known plate and bubble cap type and is operated at a pressure of from 0 to 40, preferably from 0 to 5 pounds per square inch gauge. In this column the dilute ethylene oxide is subjected to steam distillation, ethylene oxide vapors rising countercurrent to a descending stream of reflux liquid admitted through line 26. Ethylene oxide product is withdrawn overhead through line 27, condensed in condenser 28, a portion of the condensate introduced through line 26 to serve as reflux liquid and the remainder removed as product through line 29.

From the bottom of fractionating column 24 is withdrawn a mixture of water and crude ethylene dichloride which is passed to a gravity separator where settling takes place and from which the crude ethylene dichloride may be withdrawn to storage; the water layer may be discarded, or, if desired, may be returned to the process as make-up water for the chlorohydrinator.

A side stream is removed through line 31 and condensed in condenser 32. The point of removal of the side stream 32 is chosen to correspond with the point where the ethylene oxide vapors in column 24 contain the maximum proportion of acetaldehyde. This point can be determined by analyzing samples withdrawn from several trays between the feed point and the top of the column while the column is operating "normally"; i. e., without removal of a sidestream. In this manner one finds what might be called the "normal" tray of maximum aldehyde concentration, and the side-stream take-off should tentatively be connected at this level. Additional analyses may then be made of tray composition and in some cases it may be desirable to move the side-stream take-off up or down the column for greater efficiency of separation. However, very satisfactory results are ordinarily obtained simply by locating the side-stream take-off at or near the "normal" level of maximum acetaldehyde concentration. In general the side stream thus removed contains from 40% to 60% of the total amount of ethylene oxide distilled off in the fractionating column 24, the remainder of the ethylene oxide being removed from this column through line 29. The side stream contains all of the acetaldehyde fed to the fractionator, except for the small amount which passes overhead with the high-purity oxide removed through line 29, and the mere trace which is carried out at the base of tower 24 with the water. Accordingly, the actual amounts of acetaldehyde in the side-stream and the overhead product will vary with its concentration in the feed to the column. Operating with a feed containing 0.2% to 1.2% acetaldehyde based on ethylene oxide content, an overhead product is obtained containing less than 0.05% acetaldehyde and a side-stream is obtained containing about 0.4% to 3% acetaldehyde.

The condensate from condenser 32 is passed to a hydrator 33 where the ethylene oxide is subjected to hydration. Any of the available methods for effecting this conversion of ethylene oxide to ethylene glycol may be used. For example, the ethylene oxide may be reacted with water without any catalyst whatsoever under pressure and at a temperature of about 260°–428° F. A number of catalysts are suitable for speeding up the reaction of ethylene oxide with water. For example, United States Patent 2,236,919 discloses the use of a complex compound of iron and either ethylene oxide or ethylene glycol as an effective catalyst for the hydration of ethylene oxide. The use of alkaline and acid catalysts such as sodium hydroxide and sulfuric acid is well known. Thus sulfuric acid at a concentration not exceeding about .5% by weight or hydrochloric acid in similar concentration may be used. Phosphoric acid in low concentration may also be employed. When employing an acid catalyst, the hydration is carried out at a temperature of from 200° to 250° F. To avoid the production of excessive amounts of higher condensation products of ethylene glycol such as diethylene glycol and triethylene glycol, I prefer usually to conduct the hydration reaction with such an amount of water as to yield at this stage a product containing no more than approximately 10% of ethylene glycol.

When either an acid or alkaline catalyst is employed, it is generally necessary to remove or inactivate the catalyst before concentration of the resulting dilute ethylene glycol solution, which removal or inactivation is effected in purifier 34. When sodium hydroxide is used, for example, it may be neutralized with sulfuric or hydrochloric acid, thus converting the catalyst into sodium sulfate, or sodium chloride, both of which compounds are inert to ethylene glycol. When sulfuric acid is used as the hydration catalyst, it may be neutralized with an equivalent amount of sodium hydroxide, thus converting it to sodium sulfate. A preferred method of removing sulfuric acid catalyst is disclosed in United States Patent 2,409,441. According to this patent, the acid-containing dilute glycol solution is allowed to flow through a bed of granular ion-exchange resins which completely removes all anions such as sulfate, bisulfate and hydroxyalkylsulfate ions so that the effluent from the ion exchanger bed is completely free of the catalyst. Examples of such resins are the resin obtained by the condensation of organic amines or similar basic materials with formaldehyde known as "Anex" and believed to be a melamine resin, the resinous product of condensation of aromatic amines, such as aniline with formaldehyde known as "Amberlite IR-4" disclosed in United States Patent 2,409,441 of October 15, 1946, and the resin known as "A-300" manufactured by the American Cyanamid Company. This resin treatment effects the removal of free and combined acid.

Alternatively, the hydration of ethylene oxide can be catalyzed by use of a strongly acidic resin such as the cation-exchange resin known as "Amberlite IR-120," and manufactured by the Rohm & Haas Company. Using such catalyst it is only necessary to conduct an aqueous solution of ethylene oxide through a bed of the cation-exchange resin where the hydration occurs, and then concentrate the resulting glycol solution. Since in this method it is not necessary to remove any dissolved catalyst from the product solution, it has obvious advantages.

From purifier 34 the solution is passed to a multiple stage concentrator consisting, for example, of the three stages 35, 36 and 37. These stages communicate with condensers 38, 39 and 40, respectively. The condensate from condenser 38 containing substantially all of the acetaldehyde is discarded. The condensate from the other two condensers 39 and 40 is passed through line 41 to hydrator 33 and supplies the necessary water for hydration, make-up water being supplied to the hydrator from any suitable source. Eethylene glycol product is removed from stage 37 through line 42. It will be understood that instead of the triple stage concentrator diagrammatically illustrated on the drawing a double stage concentrator or one having more than three stages may be employed.

The following example is given for purposes of illustration only, it will be understood this invention is not limited to this example.

An aqueous ethylene chlorohydrin solution of about 6% concentration (containing also about 3% HCl) is withdrawn from tank 17 and admixed with a 10% lime slurry from tank 19. Approximately ½ part by weight of the lime slurry is thus added for each part of ethylene chlorohydrin solution. The temperature of the chlorohydrin solution before addition of the lime is 170° F.; the lime chlorohydrin mixture enters stripper 18 at a temperature of 195° F. This stripper is operated at a pressure of 4 pounds per square inch gauge and a temperature of 225° F. at its base and 192° F. at its top. The vapors taken off overhead at a temperature of 192° F. contain 50 weight percent. ethylene oxide. These vapors are condensed in condenser 22. Part of this condensate is fed to stripper 18 as reflux liquid. The remainder of the ethylene oxide is introduced into the fractionating column 24. This column is operated at a pressure of 6.6 pounds per square inch gauge and a temperature of 176° F. at its base and 51° F. at its top. The ethylene oxide taken off overhead is condensed in condenser 28 and consists of substantially pure ethylene oxide.

A side stream having a volume about the same as that removed through line 29 from condenser 28 is removed through line 31. This side stream contains about 0.4% acetaldehyde. It is condensed in condenser 32, dissolved in water and the aqueous solution introduced into the hydrator 33 where it is hydrated in the presence of sulfuric acid in a concentration of 0.4% by weight at a temperature of 120° F. An ethylene glycol solution of about 20% concentration is thus produced. This solution is passed through a bed of the ionexchange resin known as "A-300" (manufactured by the American Cyanamid Company) in the deionizer 34 and the thus deionized solution concentrated in the evaporator. Condensate produced in condenser 38 and containing substantially all of the acetaldehyde is discarded. The ethylene glycol product consisting of glycol, diglycol, and polyglycol is removed from line 42. The glycol product thus freed of acetaldehyde and water may then be subjected, as customary, to a fractional distillation in another column, if desired, to produce an ethylene glycol free of diethylene glycol and higher condensation products.

It will be noted the process of this invention results in the production of a high purity ethylene oxide and ethylene glycol and this without subjecting either the ethylene oxide or ethylene glycol to additional purification treatments.

Since certain changes may be made in carrying out the above process without departing from the scope of the invention it is intended that all matter contained in the above description shall be interpreted as illustrative and not in a limiting sense.

What is claimed is:

1. A process of producing ethylene oxide substantially free of acetaldehyde from ethylene oxide containing a substantial proportion of acetaldehyde, which comprises distilling the ethylene oxide containing a substantial proportion of acetaldehyde, taking off a side stream of ethylene oxide containing substantially all of the acetaldehyde, taking off overhead substantially pure ethylene oxide, hydrating the ethylene oxide containing the acetaldehyde to produce a dilute solution of ethylene glycol, and recovering from the dilute solution ethylene glycol substantially free of acetaldehyde.

2. A process of producing ethylene oxide containing not more than .05% acetaldehyde from an ethylene oxide containing in excess of about .3% acetaldehyde, which comprises distilling the ethylene oxide containing in excess of about .3% acetaldehyde, taking off overhead ethylene oxide ene oxide containing substantially all of the acetldehyde, taking off overhead ethylene oxide containing not more than .05% acetaldehyde, hydrating the ethylene oxide containing the acetaldehyde to produce a dilute aqueous solution of ethylene glycol, concentrating the dilute ethylene glycol solution in a multiple stage concentrator, removing from the first stage of such concentrator condensate containing the acetaldehyde, and removing ethylene glycol substantially free of acetaldehyde from a subsequent stage of said concentrator.

3. A process for producing ethylene oxide substantially free of acetaldehyde, which comprises distilling an alkali treated ethylene chlorohydrin solution, condensing the overhead vapor thus producing an ethylene oxide solution containing a substantial proportion of acetaldehyde, subjecting this condensate to fractional distillation, taking off overhead substantially pure ethylene oxide, removing a side stream of ethylene oxide containing substantially all of the acetaldehyde, hydrating the ethylene oxide containing the acetaldehyde to produce a dilute aqueous solution of ethylene glycol, concentrating the dilute ethylene glycol solution in a multiple stage concentrator, removing from the first stage of said concentrator condensate containing the acetaldehyde, and removing ethylene glycol substantially free of acetaldehyde from a subsequent stage of said concentrator.

4. A process for producing ethylene oxide substantially free of acetaldehyde, which comprises distilling an alkali treated ethylene chlorohydrin solution, condensing the overhead vapor thus producing an ethylene oxide solution containing in excess of about 0.3% acetaldehyde, subjecting this condensate to fractional distillation, taking off overhead substantially pure ethylene oxide, removing a side stream of ethylene oxide containing substantially all of the acetaldehyde, hydrating the ethylene oxide containing the acetaldehyde in the presence of an acid catalyst to produce a dilute aqueous solution of ethylene glycol, treating this solution to remove the catalyst therefrom, concentrating the catalyst free dilute ethylene glycol solution in a multiple stage concentrator, removing from the first stage of said concentrator condensate containing the acetaldehyde, recycling to the hydrator condensate recovered from the subsequent stages of said concentrator and recovering ethylene glycol substantially free of acetaldehyde from the last stage of said concentrator.

5. A process for producing ethylene oxide substantially free of acetaldehyde and ethylene glycol, which comprises distilling an alkali treated ethylene chlorohydrin solution, condensing the overhead vapor thus producing an ethylene oxide solution containing in excess of about .3% by weight of acetaldehyde, ethylene dichloride and water, subjecting this condensate to fractional distillation in a single distillation column, removing from an intermediate point of said column a side stream containing substantially all of the acetaldehyde and from 40% to 60% by weight of the ethylene oxide subjected to distillation in said column, removing from the bottom of said column a mixture of water and ethylene dichloride, removing overhead the remainder of the ethylene oxide subjected to distillation in said column as substantially pure ethylene oxide, hydrating the ethylene oxide containing the acetaldehyde to produce a dilute aqueous solution of ethylene glycol, concentrating this dilute solution in a multiple stage concentrator, removing from the first stage of said concentrator condensate containing the acetaldehyde, re-cycling to the hydrator condensate recovered from the subsequent stages of said concentrator and recovering ethylene glycol substantially free of acetaldehyde from the last stage of said concentrator.

PAUL P. McCLELLAN.

REFERENCES CITED

The following references are of record in the file of this patent:

UNITED STATES PATENTS

| Number | Name | Date |
| --- | --- | --- |
| 2,232,910 | Green et al. | Feb. 25, 1941 |
| 2,236,919 | Reynhart | Apr. 1, 1941 |
| 2,409,441 | Metzger | Oct. 15, 1946 |

OTHER REFERENCES

Robinson and Gilliland: "Elements of Fractional Distillation," third edition, published 1939 by McGraw-Hill Book Co., New York, N. Y., pp. 75–106, 132–150.